2,823,225

HALOARYLOXYALKYL ESTERS OF α,α,β-TRICHLOROPROPIONIC ACID

Herman O. Senkbeil and Harry F. Brust, Midland, Mich., assignors to The Dow Chemical Company, Midland, Mich., a corporation of Delaware No Drawing. Application July 2, 1956
Serial No. 595,072

7 Claims. (Cl. 260—487)

This invention relates to the haloaryloxyalkyl esters of α,α,β-trichloropropionic acid. These compounds are crystalline solids or viscous liquids somewhat soluble in many organic solvents and substantially insoluble in water. They have been found to be active as plant growth control materials and are adapted to be employed for the control of the growth and the killing of weeds and for the sterilization of soil with regard to the growth of plants. They are also useful as parasiticides for the control of many insect and bacterial organisms such as *Rhizoctonia solani*.

The new compounds may be prepared by the reaction of α,α,β-trichloropropionic acid with a haloaryloxylower-alkanol. The reaction is preferably carried out in the presence of an acid catalyst such as sulfuric acid, phenol sulfonic acid, or a cation exchange resin in the acid form, and conveniently in a water-immiscible solvent such as ethylene dichloride or toluene. The molar ratio of the reactants employed is not critical since some of the desired product is produced with any proportion of the reagents. However, good results are obtained when substantially equimolecular proportions of the reactants are employed. The employment of an excess of the alkanol and the removal of the water of reaction as formed generally results in optimum yields.

In carrying out the reaction, the α,α,β-trichloropropionic acid, haloaryloxyalkanol and catalyst, if employed, are mixed and the resulting mixture heated at a temperature of from 75° to 180° C. for a period of time to complete the reaction. In an alternative method, the haloaryloxyalkanol, α,α,β-trichloropropionic acid and catalyst, if employed, may be dispersed in the solvent and the mixture heated at the boiling temperature. During the heating, a mixture of water of reaction and some of the solvent are continuously distilled from the reaction zone, condensed, separated and the solvent recycled.

Upon completion of the reaction, the desired product may be separated by fractional distillation under reduced pressure. Where the desired ester is solid, it may be removed from the cooled reaction mixture by filtration and thereafter recrystallized from various organic solvents. Alternatively, the solvent mixture of the reaction product may be neutralized with an alkali such as dilute aqueous sodium carbonate. The resulting mixture divides into an aqueous layer and a solvent layer. The solvent layer, which contains the ester reaction product, is separated, washed with water and fractionally distilled under reduced pressure to separate the desired ester compound.

The following examples illustrate the invention but are not to be construed as limiting the same:

*Example 1.—2,(2,4,5-trichlorophenoxy)-ethyl α,α,β-trichloropropionate*

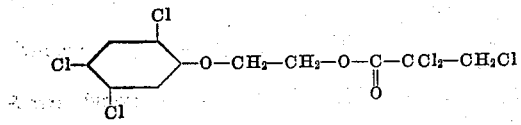

A mixture of 127 grams (0.52 mole) of 2-(2,4,5-trichlorophenoxy)-ethanol, 88.75 grams (0.5 mole) of α,α,β-trichloropropionic acid and 300 milliliters of ethylene dichloride was heated for 42 hours at a temperature of from 92° to 125° C. During the heating period, a mixture of ethylene dichloride and the water of reaction was continuously distilled from the reaction zone. When the reaction was complete, the reaction mixture was washed with water and fractionally distilled under reduced pressure to separate a 2-(2,4,5-trichlorophenoxy)-ethyl α,α,β-trichloropropionate product boiling at 178°–183° C. at 0.5 millimeter pressure. This product crystallized upon cooling and was recrystallized from a petroleum ether boiling at from 60° to 90° C. The recrystallized product melted at 101°–102° C., and had a saponification equivalent of 400 compared to the theoretical value of 401.

*Example 2.—2-(2,4,5-trichlorophenoxy)-1-propyl α,α,β-trichloropropionate*

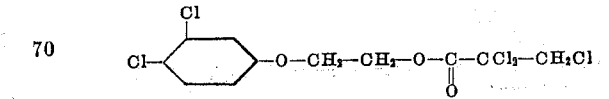

88.7 grams (0.5 mole) of α,α,β-trichloropropionic acid, 127.8 grams (0.5 mole) of 2-(2,4,5-trichlorophenoxy)-1-propanol, and 400 milliliters of ethylene dichloride were heated at the boiling temperature of the mixture for 27 hours. This operation was carried out with continuous distillation of the water of reaction as formed and some of the solvent, separation of the water and recycling of the solvent. About 0.4 milliliter of concentrated sulfuric acid was then added as a catalyst and the heating continued under the same conditions for 67 hours. Upon completion of the esterification, the reaction mixture was cooled to precipitate a 2-(2,4,5-trichlorophenoxy)-1-propyl α,α,β-trichloropropionate product which was separated by filtration. This product had a melting point of 76°–78° C. and a saponification equivalent of 416 compared to the theoretical value of 415.

*Example 3.—1-(2,4,5-trichlorophenoxy)-2-propyl α,α,β-trichloropropionate*

Cl—⟨C₆H₂Cl₂⟩—O—CH₂—CH—O—C—CCl₂—CH₂Cl
                              |         ||
                              CH₃       O

A mixture of 355 grams (2.0 moles) of α,α,β-trichloropropionic acid and 511 grams (2.0 moles) of 1-(2,4,5-trichlorophenoxy)-2-propanol was dispersed in 400 milliliters of ethylene dichloride and the resulting mixture heated for 46 hours at a temperature of from 105° to 109° C. The heating was carried out with continuous distillation of the water of reaction and some of the solvent as previously described. After this period of time, 1 milliliter of concentrated sulfuric acid was added as catalyst and the heating continued under the same conditions for another 42 hours. The reaction mixture was then washed several times with water and distilled under vacuum to separate a 1-(2,4,5-trichlorophenoxy)-2-propyl α,α,β-trichloropropionate product as a viscous liquid boiling at 190°–195° C. at 1 millimeter pressure and having a refractive index n/D of 1.5473 at 25° C.

*Example 4.—2-(3,4-dichlorophenoxy)-ethyl α,α,β-trichloropropionate*

Cl—⟨C₆H₃Cl⟩—O—CH₂—CH₂—O—C—CCl₂—CH₂Cl
                                ||
                                O 179 grams (0.82 moles) of 2-(3,4-dichlorophenoxy) ethanol, 152.6 grams (0.86 moles) of α,α,β-trichloropropionic acid and 200 milliliters of ethylene dichloride were heated for 45 hours at a temperature of from 103° to 128° C. while removing the water of reaction as formed in the usual fashion. Following the heating period, the mixture was washed with water and fractionally distilled under reduced pressure to separate the desired product as a viscous liquid having a molecular weight of 366.

*Example 5.—2-(3,4-dichlorophenoxy)-1-propyl α,α,β-trichloropropionate*

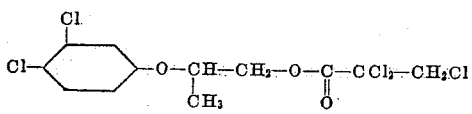

This compound was prepared by heating a mixture of 110.5 grams (0.5 mole) of 2-(3,4-dichlorophenoxy)-1-propanol, 92 grams (0.52 mole) of α,α,β-trichloropropionic acid and 200 milliliters of ethylene dichloride. The heating was carried out for 70 hours at a temperature of 103° C. while the water of reaction was continuously removed with a portion of the ethylene dichloride. Upon completion of the reaction, the reaction mixture was washed with water and fractionally distilled under reduced pressure to separate a 2-(3,4-dichlorophenoxy)-1-propyl α,α,β-trichloropropionate product having a chlorine content of 46.11 percent compared to the theoretical value of 46.55 percent. This product has a molecular weight of 380.

*Example 6.—1-(3,4-dichlorophenoxy)-2-propyl α,α,β-trichloropropionate*

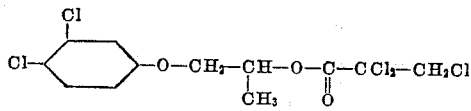

In a similar manner, 255 grams (1.09 moles) of 1-(3,4-dichlorophenoxy)-2-propanol and 202.5 grams (1.14 moles) of α,α,β-trichloropropionic acid were dispersed in 200 milliliters of ethylene dichloride and the resulting mixture heated in the usual fashion for about 70 hours at a temperature of from 102° to 130° C. About 0.5 millimeter of concentrated sulfuric acid was then added to the reaction mixture and heating continued for another 22 hours under the same conditions and at the boiling temperature. The reaction mixture was then washed with water and fractionally distilled under reduced pressure to separate a 1-(3,4-dichlorophenoxy)-2-propyl α,α,β-trichloropropionate product as a viscous liquid having a saponification equivalent of 390 compared to the theoretical value of 380.

*Example 7.—2-(2,4-dibromophenoxy)-ethyl α,α,β-trichloropropionate*

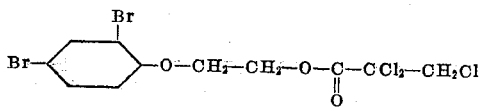

One mole quantities of 2-(2,4-dibromophenoxy)-ethanol and α,α,β-trichloropropionic acid are reacted in 200 milliliters of ethylene dichloride as described in Example 4 to obtain a 2-(2,4-dibromophenoxy)-ethyl α,α,β-trichloropropionate product having a molecular weight of 450.

*Example 8.—2-(4-chloro-2-methyl phenoxy)-ethyl α,α,β-trichloropropionate*

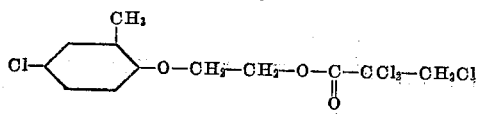

One mole quantities of 2-(4-chloro-2-methylphenoxy)-ethanol and α,α,β-trichloropropionic acid are dispersed in 400 milliliters of ethylene dichloride and the resulting mixture heated at the boiling temperature for 60 hours. The water of reaction is continuously removed along with some of the solvent as previously described. Following the reaction, the mixture is fractionally distilled to obtain the desired product which has a molecular weight of 346.

In a similar manner, other haloaryloxyalkyl α,α,β-trichloropropionates may be prepared as follows:

2 - (2,4 - dichlorophenoxy) - ethyl α,α,β - trichloropropionate by the reaction of 2-(2,4-dichlorophenoxy)-ethanol and α,α,β-trichloropropionic acid.

1 - (2,4 - dichlorophenoxy) - 2 - propyl α,α,β - trichloropropionate by the reaction of α,α,β-trichloropropionic acid and 1-(2,4-dichlorophenoxy)-2-propanol.

3 - (4 - chlorophenoxy) - 1 - propyl α,α,β-trichloropropionate by the reaction of 3-(4-chlorophenoxy)-1-propanol and α,α,β-trichloropropionic acid.

2 - (4 - bromophenoxy) - ethyl α,α,β-trichloropropionate by the reaction of 2-(4-bromophenoxy)-ethanol and α,α,β-trichloropropionic acid.

1 - (4 - bromophenoxy) - 2 - propyl α,α,β-trichloropropionate by the reaction of α,α,β-trichloropropionic acid and 1-(4-bromophenoxy)-2-propanol.

1 - (pentachlorophenoxy) - 2 - propyl α,α,β-trichloropropionate by the reaction of α,α,β-trichloropropionic acid and 1-(pentachlorophenoxy)-2-propanol.

2 - (2 - bromo - 4 - chlorophenoxy) - ethyl α,α,β-trichloropropionate by the reaction of 2-(2-bromo-4-chlorophenoxy) ethanol and α,α,β-trichloropropionic acid.

3 - (2,4 - dichlorophenoxy) - 1 - butyl α,α,β-trichloropropionate by the reaction of α,α,β-trichloropropionic acid and 3-(2,4-dichlorophenoxy)-1-butanol.

The new compounds of the present invention have been tested and found to be effective as herbicides, insecticides and bactericides. They are particularly valuable for the killing of weeds such as Johnson grass and Canary grass. For such use the products may be dispersed on an inert finely divided solid and employed as dusts. Such mixtures may also be dispersed in water with the aid of a wetting agent and the resulting aqueous dispersions employed as sprays. The products may likewise be employed as active toxic constituents of oil-in-water emulsions or water dispersions with or without the addition of wetting, dispersing or emulsifying agents. In representative operations, 100 percent controls of Canary grass are obtained with foliar applications of aqueous compositions containing 100 parts by weight of 1 - (2,4 - dichlorophenoxy) - 2 - propyl α,α,β-trichloropropionate per million parts of ultimate mixture.

The haloaryloxyalkanols employed as starting materials as herein described may be prepared by reacting an alkali metal salt of an appropriate phenol with a monohaloaliphatic alcohol such as ethylene chlorohydrin, propylene chlorohydrin, 2-chloro-1-propanol, 3-bromo-1-propanol, 3-chloro-1-propanol, 3-chloro-2-butanol and 3-chloro-1-butanol.

We claim:

1. An α,α,β-trichloropropionate of a haloaryloxyloweralkanol selected from the group consisting of bromophenoxyloweralkanols, bromotolyloxyloweralkanols, chlorophenoxyloweralkanols and chlorotolyloxyloweralkanols.

2. An α,α,β-trichloropropionate of a haloaryloxyethanol selected from the group consisting of bromophenoxyethanol, bromotolyloxyethanol, chlorophenoxyethanol and chlorotolyloxyethanol.

3. 2 - (2,4,5 - trichlorophenoxy) - ethyl α,α,β-trichloropropionate.

4. 2 - (2,4,5 - trichlorophenoxy) - 1 - propyl α,α,β-trichloropropionate.

5. 1 - (2,4,5 - trichlorophenoxy) - 1 - propyl α,α,β-trichloropropionate.
6. 2 - (3,4 - dichlorophenoxy) - 1 - propyl α,α,β-trichloropropionate.
7. 1 - (3,4 - dichlorophenoxy) - 2 - propyl α,α,β-trichloropropionate.

References Cited in the file of this patent
UNITED STATES PATENTS

| | | |
|---|---|---|
| 2,693,407 | Swezey | Nov. 2, 1954 |
| 2,754,324 | Brust et al. | July 10, 1956 |
| 2,765,224 | Lambrech | Oct. 2, 1956 |